United States Patent Office 2,789,242
Patented Apr. 16, 1957

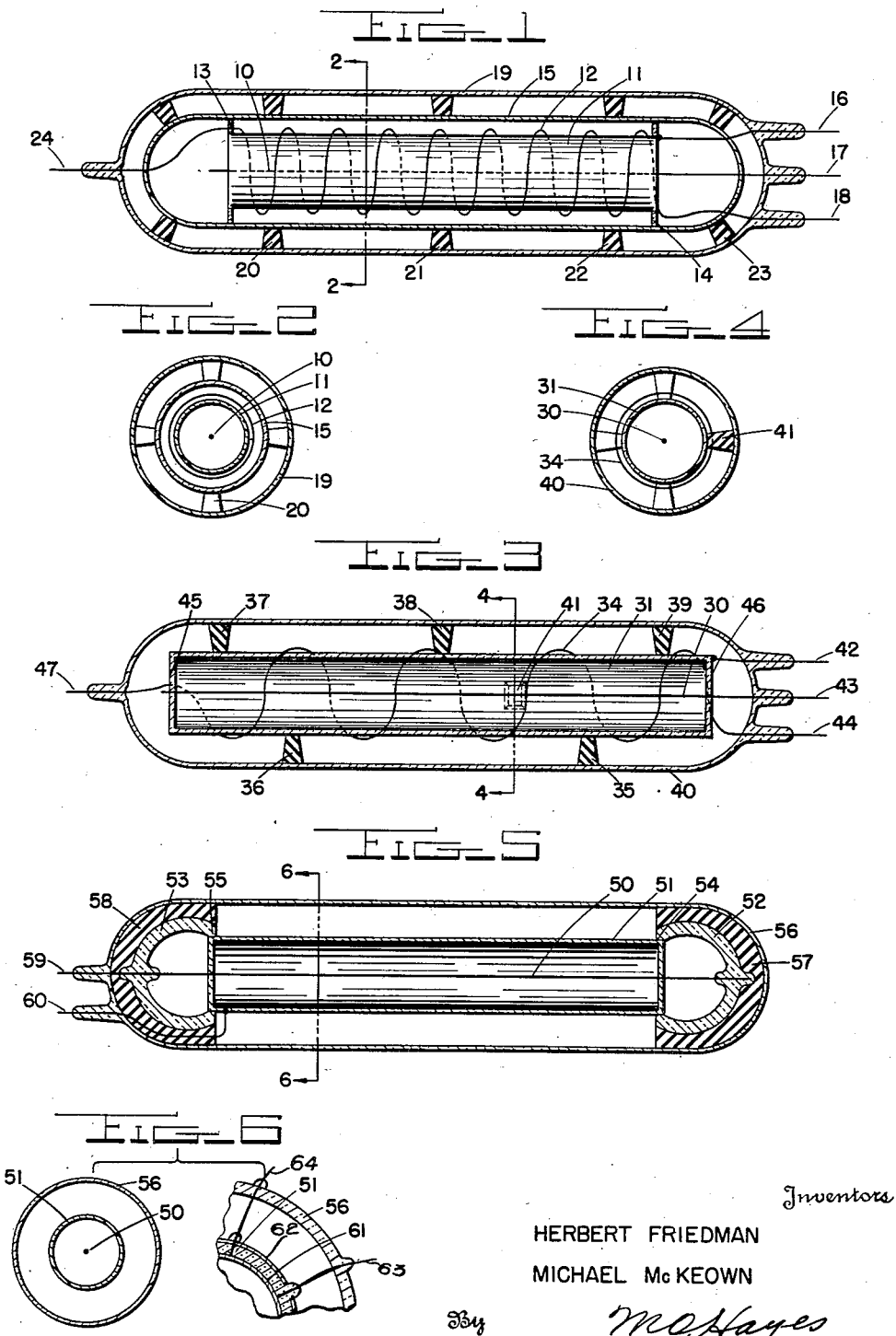

2,789,242

GEIGER-MUELLER COUNTER

Herbert Friedman, Arlington, Va., and
Michael McKeown, Detroit, Mich.

Application February 13, 1946, Serial No. 647,412

1 Claim. (Cl. 313—93)

(Granted under Title 35, U. S. Code (1952), sec. 266)

Our invention relates to radiation detecting and measuring devices of the Geiger-Mueller counter type and more particularly to a Geiger-Mueller tube which is temperature compensated to prevent erratic operation as a result of exposure to wide extremes of temperature.

The common form of Geiger-Mueller tube comprises a coaxial anode and cathode wherein the cathode is cylindrical in form and the anode comprises a coaxial wire, a radiation permeable envelope enclosing the anode and cathode and supporting them in spaced relationship, and a gaseous filling for the tube which will usually comprise one of the rare gases such as argon, neon, krypton, xenon or some other gas such as hydrogen, nitrogen, or helium. The entrance of a quantum of an ionizing radiation into the tube produces a small amount of ionization in the gas, and the application of a high voltage across the anode and cathode causes the appearance of a momentary discharge pulse triggered by the radiation. The frequency of the pulses produced will vary with the intensity of the radiation. When radiations of relatively high intensities are to be measured it is essential that the discharge pulse produced by a single quantum of radiation be over in less than $10^{-4}$ second in order that the tube may recover and be prepared to receive another quantum of radiation. When a tube fails to recover rapidly from a single discharge, it tends to go over into intermittent or continuous glow discharge which makes it useless for counting.

A partial solution to the problem of providing tubes to count pulses rapidly has been found in the discovery that certain organic vapors when added to the atmosphere contained in a counter tube function to quench the tube discharge rapidly. Ethyl alcohol vapor has become a relatively standard quenching agent to be added in small amounts to the atmosphere of a Geiger-Mueller counter. Other organic quenching agents such as petroleum ether and methylene bromide have also been successfully used. One of the disadvantages of an organic vapor as a quenching agent is that the vapor is condensable and requires employment of the tube at ambient temperatures above the dew-point of the particular vapor being used. For many applications of Geiger-Mueller counters, therefore, it is practically impossible to have a vapor quenched tube for radiation intensity measurements which must be made at very low temperatures.

One good example of a situation requiring a Geiger-Mueller counter for operation at very low temperatures is the fuel quantity gauge for use in aircraft. In flight, the airplane will encounter extremely low temperatures, and when a Geiger counter is partially exposed to the atmosphere as in a wing tank, condensation of the quenching vapor contained therein will take place with resultant erratic operation of the counter tube and consequently of the fuel quantity gauge. Such an application of the Geiger-Mueller counter is described in United States patent application Serial No. 553,407, filed September 9, 1944, by Lester Wolfe.

It is an object of our invention to provide a structure for a Geiger-Mueller counter which is effectively isolated from the atmosphere so that temperature control of the interior of a tube can be accomplished easily and conveniently.

Other objects and advantages of our invention will be apparent from the following specification and drawings, in which:

Figure 1 represents a longitudinal cross section through a Geiger-Mueller counter constructed according to our invention;

Figure 2 is a transverse section of the tube shown in Figure 1 taken along the line 2—2;

Figure 3 is a longitudinal cross section of a second form of Geiger-Mueller counter made according to our invention;

Figure 4 is a transverse section of the tube shown in Figure 3 taken along the line 4—4;

Figure 5 is a longitudinal cross section of a third form of Geiger-Mueller counter made according to our invention; and Figure 6 is a transverse section of the tube shown in Figure 5 and taken along the lines 6—6.

Our invention comprises a Geiger-Mueller counter having the features of construction, combinations of elements, and arrangements of parts to be hereinafter more particularly described, and the method of suspending, heating and isolating the essential elements of the said Geiger-Mueller counter to provide for the maintenance of a substantially constant temperature therein to maintain the tube at a temperature for optimum functioning of the self-quenching atmosphere contained in the tube.

Referring to Figure 1, which shows in cross section one form of Geiger-Mueller counter made according to our invention, 10 represents the anode wire of the counter, 11 the cathode cylinder, and 12 a heating coil loosely wound around the cathode cylinder to leave a wide spacing between convolutions as shown. The ends of the cathode cylinder are closed and defined by mica discs 13 and 14 which provide for support of the counter cylinder and coaxial anode wire in spaced relationship. Envelope 15 encloses the electrical portions of the counter and seals therein the gaseous filling of the tube which ordinarily will comprise a mixture of one of the rare gases and a quenching vapor such as ethyl alcohol. The electrical connections are made to the electrical portions of the tube through connectors 16, 17, 18, and 24 to provide for proper isolation of the Geiger-Mueller counter. The entire structure is enclosed within a second envelope, 19, and maintained in spaced relationship therefrom by insulating spacers 20, 21, 22, 23, etc. The insulating spacers act merely as supports, are made as small as is consistent with satisfactory mechanical support, and are preferably made of a semi-resilient material such as cork or rubber. The space between the envelope of the Geiger-Mueller counter and the outer enclosing envelope is evacuated to a high degree in order to reduce the heat transfer capacity of the tube. To reduce the heating gains and losses via radiation the inner surface of the outer envelope 19, is silvered as is the outer surface of the envelope 15 of the counter tube itself.

The cross section of the tube shown in Figure 2 shows the parts described in Figure 1 numbered correspondingly.

In Figure 3 there is shown a second embodiment of the Geiger-Mueller tube which comprises a coaxial anode wire 30 and enclosing envelope 31 the inner surface of which is coated a thin film of gold, platinum, or silver to provide the cylindrical cathode for the counter. The ends of the cylinder 31 are terminated in plugs 45 and 46 in such a manner that the gaseous contents of the tube are sealed therein, and as a result the Geiger-Mueller counter tube is, in effect, completely enclosed in the cylinder and isolated from an outer external envelope 40, by spaced insulators 35, 36, 37, 38, 39 and 41. The space between cylinder 31 and envelope 40 is evacuated, and electrical connections to the counter are made through leads 42, 43, 44, and 47.

As pointed out in connection with the description of the structure shown in Figure 1, the space between the outer envelope of the structure and the Geiger-Mueller counter itself as shown in Figure 3 is carefully evacuated to reduce the heat transfer capacity of the structure. The relationship of the parts is apparent in Figure 4.

In Figure 5 there is shown a third form of Geiger-Mueller counter made according to our invention wherein 50 represents the anode wire in a coaxial cathode cylinder 51, and 52 and 53 represent glass end seals mounted on the cathode cylinder and cemented thereto at points 54 and 55. The Geiger-Mueller counter itself is mounted within an envelope 56 and cushioned in place by installations at 57 and 58 of a resilient cushioning material such as rubber or cork which serve to support the tube securely within the envelope. The space between the envelope 56 and the counter cylinder 51 is carefully evacuated to reduce the amount of heat capable of being conducted therefrom. Electrical connections are made to the counter by way of connectors 59 and 60. For heating the tube to maintain it at a temperature above ambient temperature, various means can be adopted such as a heating coil wound around the cathode cylinder 51, or the cathode cylinder 51 may be made of glass or other insulating material coated on the inside as shown in Figure 6 with a thin film of a conducting material 61, such as gold, silver, aluminum, or platinum and coated on the outside with a film 62 of a carbon suspension such as aquadag, so that this coating itself can act as an electrical resistor to provide the necessary amount of heating for the tube.

In the preparation of a thin metallic film for use as a cathode certain metals such as silver may be chemically deposited by a method similar to the production of silver mirror surfaces. This process involves the application of a solution of a salt of the metal on the surface to be coated, followed by the application of a reducing agent. The salt is thus reduced to the metal, and a thin, uniform layer may be deposited thereby. A layer of a material such as aluminum may be deposited by evaporation of the metal and condensation on the surface, such as is done in the preparation of reflecting telescope mirrors. The inert metals, such as gold and platinum, may be deposited by sputtering the metal on the surface through the use of an electric arc.

In the preparation of the resistive coating to be used for heating the tube, aquadag, or a carbon suspension in alcoholic solution may be painted on the surface of the tube and allowed to dry.

Since the amount of heat required in the Geiger-Mueller counter tube to prevent condensation of the quenching vapor is relatively small a further modification of the construction is to apply a current to the cathode or cathode coating through suitable leads 63—64 connected to the coating 61 at points spaced longitudinally of the tube, said current being of such amount that the quenching vapors remain above condensation temperature. By the use of such means the need either of a heating coil or a resistive heating layer is eliminated.

The structure and relationship of the elements is further shown in the cross sectional diagram of Figure 6.

As explained in the preliminary remarks, Geiger-Mueller counters are used for the measurement of unknown radiation intensities and can be used to detect extremely weak radiation. In such applications as high altitude cosmic ray measurements, a fuel quantity gauge as previously mentioned, the following of nuclear reactions at very low temperatures, and various other instances where the ambient temperature in which the radiation is to be detected and measured is extremely low, it is desirable to have a tube which will function at that temperature and in which the gaseous constituents will not condense or freeze. By constructing Geiger-Mueller counters according to the method described herein, heating means can be provided to maintain the tube interior at an operative temperature, and the tube can be isolated by surrounding it with a vacuum jacket. Isolating the tube by enclosing it in an evacuated space is thus highly advantageous because it is possible to maintain the gaseous material at a temperature above ambient temperature with the expenditure of only a very small amount of energy.

We have found that Geiger-Mueller counters constructed according to the several embodiments described herein and isolated through enclosure within an evacuated space when of a size approximately 10 centimeters in length and 2 or 3 centimeters in diameter can be operated satisfactorily in ambient temperatures as low as —40° C. with the expenditure of energy at the rate of only about 10 to 15 watts in order to maintain the gaseous filling in efficient quenching condition.

It has been stated with reference to the descriptions of the several embodiments in Figures 1, 2, and 3 that the space between the counter tube and its isolating envelope is evacuated to a high degree. The evacuation should be sufficient to work a material reduction in the heat transfer capacity of the tube and, if the air pressure in the space be reduced to a few centimeters of mercury, an operative tube will be produced. We have found that even higher degrees of evacuation are preferred and that reduction of the air pressure to valves of the order of a millimeter of mercury, or less, e. g. $10^{-3}$ millimeter, produce results comparable to the test summarized above.

From the foregoing description, examples, and data, the form of several embodiments of our invention will be clear, but it is to be understood that the invention is not restricted to the present detailed disclosure to any extent other than it is restricted by the manner in which such invention is claimed.

The invention described herein may be manufactured and used by or for the Government of the United States of America for governmental purposes without the payment of any royalties thereon or therefor.

What is claimed is:

A Geiger-Mueller counter for operation at wide variations in ambient temperature comprising a cylindrical cathode element and an anode coaxially arranged therein, a sealed envelope for the cathode and anode, a gaseous atmosphere in said envelope containing a readily condensable quenching vapor such as ethyl alcohol, said cathode element comprising a thin metallic film capable of serving both as cathode and heater to prevent condensation of said quenching vapor, and a second radiation-permeable envelope surrounding said first envelope, spaced therefrom and sealed from the interior of said first envelope, the space between the first and second envelopes being evacuated to minimize heat transmission therethrough.

References Cited in the file of this patent

UNITED STATES PATENTS

| | | |
|---|---|---|
| 1,897,587 | Pirani | Feb. 14, 1933 |
| 1,957,422 | Freeman | May 1, 1934 |
| 1,984,426 | Pirani et al. | Dec. 18, 1934 |
| 1,989,786 | Brueckmann | Feb. 5, 1935 |
| 2,009,202 | Pirani et al. | July 23, 1935 |
| 2,087,759 | Gaidies | July 20, 1937 |
| 2,409,498 | Keston | Oct. 15, 1946 |
| 2,433,554 | Herzog | Dec. 30, 1947 |

FOREIGN PATENTS

| | | |
|---|---|---|
| 351,889 | Germany | Apr. 15, 1922 |